F. S. ELLIS.
VEHICLE WHEEL.
APPLICATION FILED OCT. 25, 1912.

1,078,907.

Patented Nov. 18, 1913.

2 SHEETS—SHEET 1.

Witnesses

Flem. S. Ellis Inventor by C. A. Snow & Co., Attorneys

F. S. ELLIS.
VEHICLE WHEEL.
APPLICATION FILED OCT. 25, 1912.

1,078,907.

Patented Nov. 18, 1913.

2 SHEETS—SHEET 2.

Witnesses

Flem. S. Ellis, Inventor by *Attorneys*

UNITED STATES PATENT OFFICE.

FLEM S. ELLIS, OF HANNIBAL, MISSOURI.

VEHICLE-WHEEL.

1,078,907.

Specification of Letters Patent.

Patented Nov. 18, 1913.

Application filed October 25, 1912. Serial No. 727,810.

*To all whom it may concern:*

Be it known that I, FLEM S. ELLIS, a citizen of the United States, residing at Hannibal, in the county of Marion and State of Missouri, have invented a new and useful Vehicle-Wheel, of which the following is a specification.

The present invention relates to improvements in vehicle wheels, the primary object of the invention being the provision of a novel form of wheel, provided with a hub cavity and a spoke carrying annulus, the two being so positioned as to permit of the introduction therewithin of a spring cushioning device or a pneumatic cushion as may be desired, the spoke annulus member being permitted a slight gyratory movement to throw the cushioning action entirely thereupon, thus rendering it unnecessary to employ a pneumatic or cushion tire upon the wheel and thus reducing the liability of punctures and blow-outs to a minimum.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
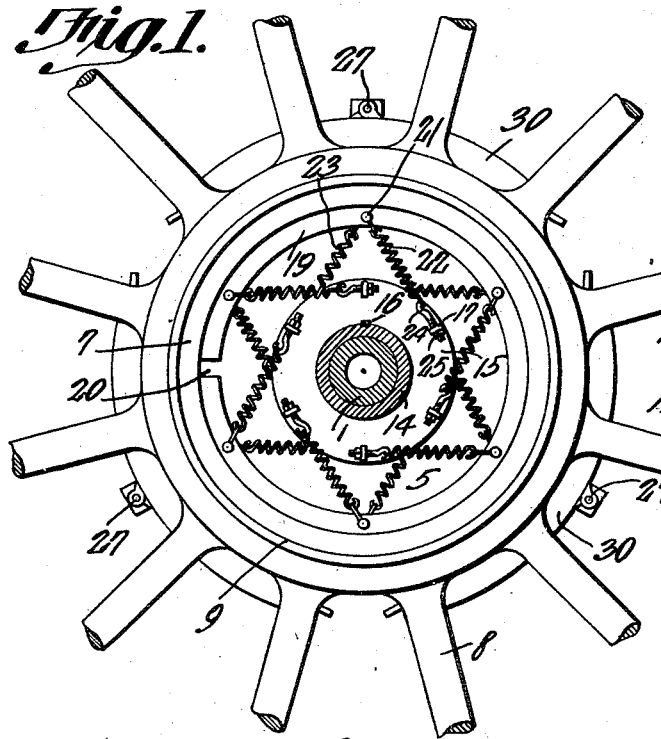
Figure 3:
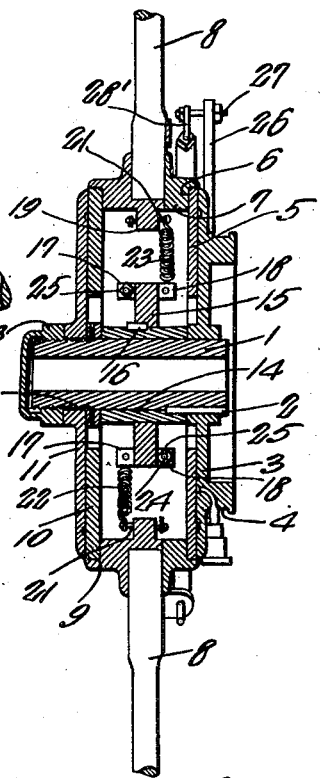
Figure 2:
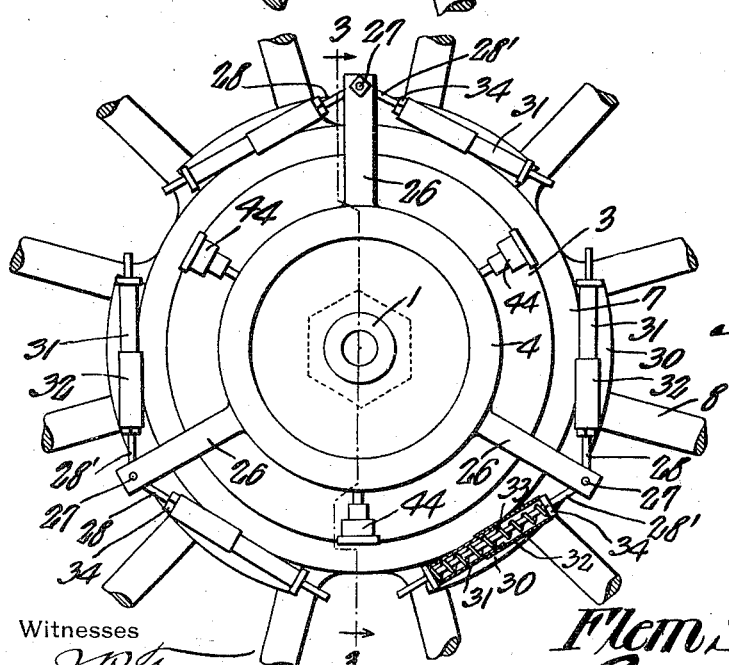
Figure 4:
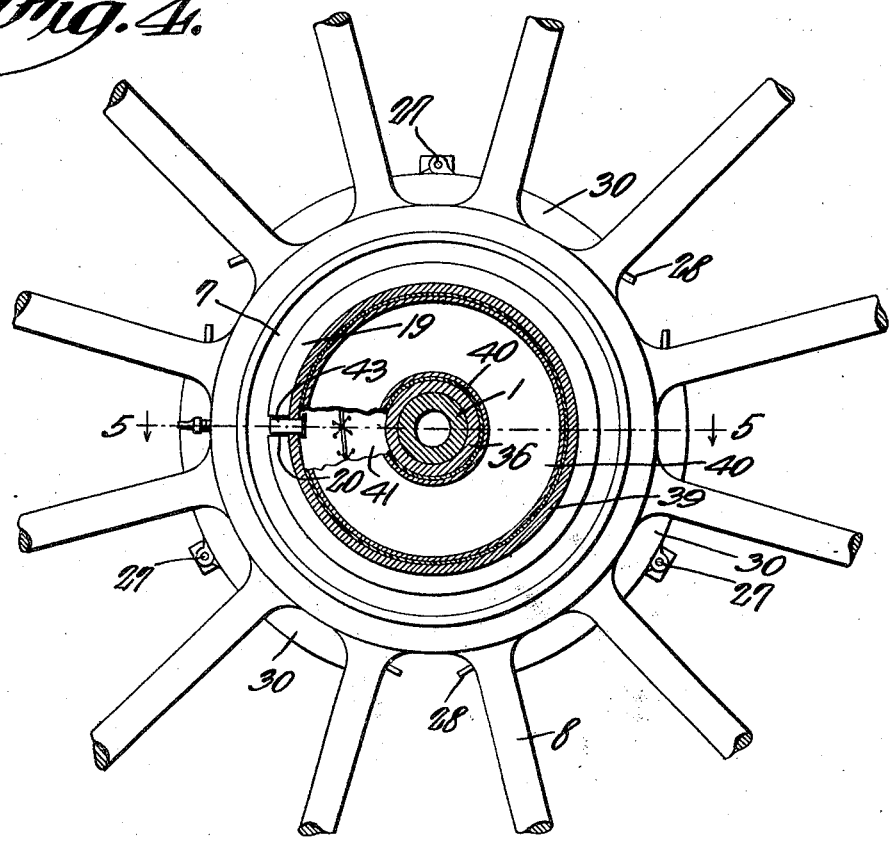
Figure 5:
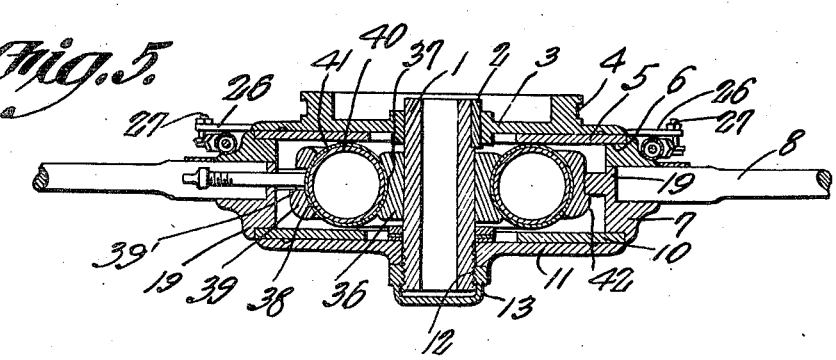

In the drawings—Figure 1 is a side elevation of the hub of the wheel with the outer disk removed and the two sleeves in section to show the cavity between the spoke annulus and the hub with a spring cushioning device interposed. Fig. 2 is a view in elevation taken from the inner side of the hub. Fig. 3 is a section taken on line 3—3 of Fig. 2. Fig. 4 is a view similar to Fig. 1, showing a pneumatic cushion in position. Fig. 5 is a section taken on line 5—5 of Fig. 4.

Referring to the drawings, and to all views therein relatively to the main parts of the wheel, the numeral 1 designates a sleeve which constitutes the boxing of the hub, the same having disposed thereupon the key 2, whereby the disk 3 is held for rotation with the sleeve 1. This disk 3 is provided with the brake band 4 which is of usual construction, this band being employed when the wheel is a braking wheel or may be eliminated when used as a steering or other wheel. A metal disk or washer 5 is disposed upon the inner face of the disk 3 and is prevented outward movement by resting within the annular recess 6 formed at one side of the spoke carrying annulus 7, this spoke carrying annulus 7 being provided with the usual spokes 8. At the opposite side to the annular recess 6 is provided an annular recess 9 for the reception of the metal washer or disk 10, which is abutted by the inner face of the outer disk 11, said disk being threaded at 12 upon the threaded end of the sleeve 1 and held against outward displacement by means of the cap nut 13. By this construction, the spoke carrying annulus 7 and the two washers 5 and 10 are permitted a slight gyratory or sliding movement between the disks 3 and 11 and provide an annular cavity or chamber about the sleeve 1, for reception of the cushioning means as will presently appear.

The sleeve 14, as clearly shown in Fig. 3, is keyed upon the sleeve 1 by means of the key 2 and the same has keyed thereupon centrally thereof, by means of the key 16, the spring attaching disk or annulus 15, the same being provided with a plurality of oppositely disposed lugs 17—18, as clearly shown in Fig. 3. The sleeve 14 and the annulus 15 are used in connection with a spring hub, and as particularly shown in Figs. 1 and 3. The spoke carrying annulus is provided with the inwardly projecting ring or flange 19, which as shown in Fig. 1, is provided with the slot 20, the purpose of which will later appear, in connection with a pneumatic cushion. A plurality of pins 21 are disposed through the ring or flange 19 at equi-distances throughout the circumference thereof, and connected to each of the pins are the outer terminals of the two springs 22 and 23, whose respective inner terminals are connected by means of the adjustable hooks 24. These hooks 24 are disposed in the respective lugs 17 and 18 and are adjustably connected, each to regulate the tension of it's respective spring by means of the nut 25. It will thus be seen that the respective series of springs 22 and 23 may be positioned, as clearly shown in Fig. 1 so as to permit of the yielding action between the spoke carrying annulus and the hub member, permitting the annulus to have a slight gyratory movement relatively to the hub member, said springs being increased or decreased in number according to the load carrying capacity of the wheel.

In order to permit circumferential movement of the spoke carrying annulus relatively to the hub member which constitutes the axle 1 and the disks 3 and 11, a plurality of arms 26 are carried by either one of the disks, in this instance the disk 3, and project outwardly beyond the spoke carrying annulus 7. A pin 27 is disposed in the outer end of each of the arms 26 and has connected thereto, for slight pivotal movement, one end of the respective cushioning rods 28—28'. The other terminals of these respective rods 28—28' are slidably mounted in the apertured lugs 29 of the plate 30, which is secured to the spoke carrying annulus, and mounted for sliding movement, one telescoping within the other, are the respective sleeves 31 and 32. The sleeve 31 being connected to the lug 29, while the sleeve 32 is connected to the nut 34 which is disposed rigidly or fixedly upon the rod 28 or 28' adjacent the arm 26. A spring 33 is disposed within the sleeves 31—32 and is thus protected by the telescoping members.

Where a pneumatic cushion is employed, as viewed in Figs. 4 and 5, an annulus 36 is disposed loosely upon the sleeve 1 within the disks 3 and 11 and the spoke carrying annulus 7, the concaved face 37 having disposed therein, the pneumatic envelop 40 which as shown, is provided with the protecting leather casing 41, an outer annulus 39 having its concaved face 38 opposed thereto. This outer annulus 38 is provided with a circumferential edge or bead 42 which permits of the engagement therewith of the flange 19 of the spoke carrying annulus 7, while the valved tube 43 of the pneumatic envelop is disposed through a slot 39' formed in the annulus 39 and also through the slot 20 of the flange 19, the same extending through the spoke carrying annulus between any two of the respective spokes. By this means, the air cushion will provide the necessary cushion between the spoke annulus and the hub member and as the annulus 36 is permitted the necessary rotation upon the sleeve 1, no damaging effect is imparted to the envelop during the slight circumferential movement of the spoke carrying annulus due to traction and load conditions.

The arms 26 are employed to limit the circumferential movement of the spoke carrying annulus, as in the other case, and are in the present case absolutely essential, while when used with the springs 22 and 23, and in cases where such springs are exceedingly heavy, the arms 26 may be dispensed with. In order to lubricate between the adjacent faces of the washers or disks 5 and 10, and the disks 3 and 11, the lubricating devices 44 are provided.

What is claimed is:

A vehicle wheel, including a hub, a spoke carrying annulus thereabout, a resilient support between the hub and annulus, and means for connecting the hub and annulus for simultaneous rotation, including a plurality of radially disposed arms carried by the hub, a plurality of spaced plates carried by the annulus, one to each radial arm, each plate having an apertured rod guiding lug at its end remote from the arm, a plurality of pairs of rods, one pair being pivotally connected to the outer end of each radial arm and having their free ends threaded through the apertured lugs of the respective pairs of plates, two telescopic sleeves surrounding each rod, the end of one sleeve bearing against the lug of its plate, a nut upon the rod adjacent the connection of the rod to the radial arm for limiting the movement of the other sleeve, and a spring surrounding each rod and incased within the sleeve.

In testimony that I claim the foregoing as my own, I have hereto affixed my signature in the presence of two witnesses.

FLEM S. ELLIS.

Witnesses:
E. C. STEWART,
THOS. L. ANDERSON.